(12) United States Patent
Bohm et al.

(10) Patent No.: US 9,740,459 B2
(45) Date of Patent: *Aug. 22, 2017

(54) AUTOMATED GENERATION OF BRIDGING CODE TO AUGMENT A LEGACY APPLICATION USING AN OBJECT-ORIENTED LANGUAGE

(71) Applicant: International Business Machines Corporation, Armonk, NY (US)

(72) Inventors: Fraser P. Bohm, Salisbury (GB); Elisabetta Flamini, Romsey (GB); Ian J. Mitchell, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/497,033

(22) Filed: Sep. 25, 2014

(65) Prior Publication Data

US 2015/0012909 A1 Jan. 8, 2015

Related U.S. Application Data

(63) Continuation of application No. 13/227,241, filed on Sep. 7, 2011, now Pat. No. 8,881,100.

(51) Int. Cl.
*G06F 9/44* (2006.01)

(52) U.S. Cl.
CPC .............. *G06F 8/315* (2013.01); *G06F 8/30* (2013.01); *G06F 8/36* (2013.01); *G06F 9/44* (2013.01)

(58) Field of Classification Search
CPC .................................... G06F 8/30; G06F 8/36
(Continued)

(56) References Cited

U.S. PATENT DOCUMENTS 6,314,560 B1 * 11/2001 Dunn et al. .................. 717/153
6,931,623 B2 8/2005 Vermeire et al.
(Continued)

OTHER PUBLICATIONS

Chia-Chu Chiang, Automated Software Wrapping, Proceedings of the 45th Annual Southeast Regional Conference, ACM-SE, Mar. 23-24, 2007, pp. 59-64, Association for Computing Machinery, New York, NY.
Harry M. Sneed, Integrating Legacy Software into a Service Oriented Architecture, Proceedings of the Conference on Software Maintenance and Reengineering (CSMR'06), 2006, pp. 1-11, IEEE Computer Society, Washington, DC.
(Continued)

*Primary Examiner* — Li B Zhen
*Assistant Examiner* — Bradford Wheaton
(74) *Attorney, Agent, or Firm* — Lee Law, PLLC; Christopher B. Lee (57) ABSTRACT

A legacy machine-oriented language interface definition is received of a new module to be implemented, using an object-oriented language, to provide a new feature within a legacy machine-oriented language application that is executable within a legacy application execution platform. An object-oriented class definition and bridging code that interfaces the object-oriented class definition to the legacy machine-oriented language interface definition are generated. An updated version of the object-oriented class definition is received that includes object-oriented code that implements functionality of the new feature within the new module. A new executable version of the legacy machine-oriented language application is built. The new executable version of the legacy machine-oriented language application is executable within the legacy application execution platform, and includes the new module as a new object accessible using the legacy machine-oriented language interface definition with the functionality of the new feature as implemented by the object-oriented code.

15 Claims, 4 Drawing Sheets

(58) Field of Classification Search
USPC .......................................................... 717/108
See application file for complete search history.

(56) References Cited

U.S. PATENT DOCUMENTS

| | | | |
|---|---|---|---|
| 6,964,053 B2 | 11/2005 | Ho et al. | |
| 6,971,085 B1* | 11/2005 | Alcorn | 717/108 |
| 7,131,110 B2* | 10/2006 | Brewin | G06F 8/51 |
| | | | 712/E9.082 |
| 7,418,508 B2 | 8/2008 | Haller et al. | |
| 7,559,066 B2 | 7/2009 | Ho et al. | |
| 7,689,701 B2 | 3/2010 | Hollingsworth | |
| 2002/0156792 A1* | 10/2002 | Gombocz | G06F 17/30286 |
| 2004/0268371 A1 | 12/2004 | Carrell et al. | |
| 2007/0106722 A1 | 5/2007 | Zeldin et al. | |
| 2009/0031291 A1* | 1/2009 | Adams | 717/137 |
| 2009/0271412 A1* | 10/2009 | Lacapra et al. | 707/10 |
| 2011/0283280 A1* | 11/2011 | Farrell et al. | 718/1 |
| 2012/0005654 A1* | 1/2012 | Graham | 717/120 |

OTHER PUBLICATIONS

Harry M. Sneed, Migrating from COBOL to Java, Proceedings of the 26th IEEE International Conference on Software Maintenance, Sep. 12-18, 2010, pp. 1-7 (1 citation page added), IEEE Computer Society, Washington, DC.

Harry M. Sneed, Migrating PL/I Code to Java, Proceedings of the 2011 15th European Conference on Software Maintenance and Reengineering (CSMR), Mar. 1-4, 2011, pp. 287-296 (note that page 296 is blank, 1 citation page added), IEEE Computer Society, Washington, DC.

United States Patent and Trademark Office, Office Action for U.S. Appl. No. 13/227,241, Jul. 8, 2013, pp. 1-17, Alexandria, VA, USA.

United States Patent and Trademark Office, Office Action for U.S. Appl. No. 13/227,241, Apr. 3, 2014, pp. 1-12, Alexandria, VA, USA.

United States Patent and Trademark Office, Notice of Allowance for U.S. Appl. No. 13/227,241, Jul. 2, 2014, pp. 1-5, Alexandria, VA, USA.

* cited by examiner

AUTOMATED GENERATION OF BRIDGING CODE TO AUGMENT A LEGACY APPLICATION USING AN OBJECT-ORIENTED LANGUAGE

RELATED APPLICATIONS

This application is a continuation of, claims priority to, and claims the benefit of U.S. patent application Ser. No. 13/227,241, titled "AUTOMATED GENERATION OF BRIDGING CODE TO AUGMENT A LEGACY APPLICATION USING AN OBJECT-ORIENTED LANGUAGE," which was filed in the U.S. Patent and Trademark Office on Sep. 7, 2011, which has a current status of "Allowed," and which is incorporated herein by reference in its entirety.

BACKGROUND

The present invention relates to bridging code generation. More particularly, the present invention relates to automated generation of bridging code to augment a legacy application using an object-oriented language.

Customer information control system (CICS®) transaction servers are organized into domains and gates that are implemented in programming language/cross systems (PL/X). PL/X is a machine-oriented language. Each domain represents a single component of the CICS® environment. A domain gate represents an interface to a domain.

BRIEF SUMMARY

A method includes receiving, at a processor, a legacy machine-oriented language interface definition of a new module to be implemented, using an object-oriented language, to provide a new feature within a legacy machine-oriented language application that is executable within a legacy application execution platform; generating, via the processor, an object-oriented class definition and bridging code that interfaces the object-oriented class definition to the legacy machine-oriented language interface definition; receiving an updated version of the object-oriented class definition that comprises object-oriented code that implements functionality of the new feature within the new module; and building a new executable version of the legacy machine-oriented language application, executable within the legacy application execution platform, and comprising the new module within the new executable version as a new object accessible via the legacy machine-oriented language interface definition and with the functionality of the new feature as implemented by the object-oriented code in the updated version of the object-oriented class definition.

A system includes a memory and a processor programmed to: receive a legacy machine-oriented language interface definition of a new module to be implemented, using an object-oriented language, to provide a new feature within a legacy machine-oriented language application that is executable within a legacy application execution platform; generate an object-oriented class definition and bridging code that interfaces the object-oriented class definition to the legacy machine-oriented language interface definition; receive an updated version of the object-oriented class definition that comprises object-oriented code that implements functionality of the new feature within the new module; and build, within the memory, a new executable version of the legacy machine-oriented language application, executable within the legacy application execution platform, and comprising the new module within the new executable version as a new object accessible via the legacy machine-oriented language interface definition and with the functionality of the new feature as implemented by the object-oriented code in the updated version of the object-oriented class definition.

A computer program product includes a computer readable storage medium including computer readable program code, where the computer readable program code when executed on a computer causes the computer to receive a legacy machine-oriented language interface definition of a new module to be implemented, using an object-oriented language, to provide a new feature within a legacy machine-oriented language application that is executable within a legacy application execution platform; generate an object-oriented class definition and bridging code that interfaces the object-oriented class definition to the legacy machine-oriented language interface definition; receive an updated version of the object-oriented class definition that comprises object-oriented code that implements functionality the new feature within of the new module; and build a new executable version of the legacy machine-oriented language application, executable within the legacy application execution platform, and comprising the new module within the new executable version as a new object accessible via the legacy machine-oriented language interface definition and with the functionality of the new feature as implemented by the object-oriented code in the updated version of the object-oriented class definition.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated generation of bridging code to augment a legacy application using an object-oriented language. The present subject matter automates and facilitates interface code for implementation of new components within object-oriented languages for legacy platforms implemented in machine-oriented languages. For purposes of example, the description below utilizes automation of implementation of new CICS® domains, which are conventionally implemented in PL/X, and allows the new CICS® domains to be partially implemented in object-oriented programming paradigms and languages, such as Java™ and to be interface to the PL/X platform via bridging code that is automatically generated. A systematic mechanism is provided that automatically generates layers of code to call a method of a PL/X object implemented in Java™. Utilizing the present subject matter, new features may be added to products developed in long-standing machine-oriented programming languages without having to "port" products from one language to another. Objects implemented in a native language, such as PL/X, are directly transformed into object-oriented classes, such as one or more Java™ classes. Alternatively, a Java™ class may be created and bridging code to port that new class to the legacy platform may be automatically generated. As such, new functionality developed in newer object-oriented languages may be seamlessly integrated into a legacy framework and application development process. Accordingly, investments in legacy systems may be preserved, while adding functionality and new features using newer object-oriented concepts and languages.

For purposes of the present description, the terms "legacy," "legacy platform," "legacy systems," "legacy languages," and other similar terms refer to applications or platforms respectively that are developed using a machine-oriented programming language, such as PL/X, or that support execution of such an application. It should be noted that while the present examples utilize a PL/X object implemented in Java™, the present subject matter is applicable to any platform implemented in a machine-oriented language or other legacy language that may be augmented using an object-oriented language. Accordingly, any such platforms are considered within the scope of the present subject matter. Further, PL/X is considered one possible example of a legacy or machine-oriented programming language and Java™ is considered one possible example of an object-oriented language for purposes of the present description. Other legacy to object-oriented language combinations are possible and all such legacy to object-oriented language combinations are considered within the scope of the present subject matter.

For purposes of the present examples, the architectural structure of a CICS® transaction server is organized in domains and gates implemented in PL/X. A "domain" represents a functional component and may include a collection of objects called "gates." A "gate" represents an object, including methods (procedures) and attributes. Methods provide behavior and attributes provide data via a public interface of an object. Gates provide an interface by which to access the domains as interface objects. Domains may have other modules that are not gates/interfaces.

Within a CICS® implementation, a CICS® gate is implemented as a PL/X object that includes methods (procedures) and attributes. The attributes are referred to as a parameter list (plist). Method interface definitions are called "CDURUNs." The present subject matter computer generates a code layer to implement a Java™ class defined by the respective gate definition that is defined in PL/X for the PL/X platform.

For purposes of the present description, the terms "domain" and "component" may be interchanged, the terms "gate" and "object" may be interchanged, and the terms "CDURUN" and "interface" may be interchanged, both with respect to the singular and plural of the respective terms.

Based upon the description herein, a compilation or build process of a PL/X module that implements a gate automatically generates several modules. It should be noted that the order of generation of the modules within the examples below is not to be considered limited. As such, the respective modules may be generated in any order as appropriate for a given implementation.

One module that is computer generated is a "C" language header file that defines the plist memory structure for the CICS® gate. The C language header module defines a structure that includes a C language definition of data for the gate. This module will be termed the "C header module" herein for reference.

An additional module that is computer generated is a "C" language (C-language) module, or separate file, that implements a Java™ native interface (JNI) code to transform the plist into "jobjects" and to invoke methods of a PlistHolder class, described in more detail below, by passing the plist jobjects to the respective methods. The JNI code is a "C" code layer that interfaces the native application with the Java™ component to be created. The JNI code is responsible for passing data and invoking method calls to the PL/X gate. The JNI code converts "C" language structures defined by the C header module into JNI objects to be passed to the Java™ code. For example, a plist memory block may be copied into a byte array and the memory area(s) pointed to by plist pointers may be copied into an array of byte arrays. This module will be termed the "JNI module" herein for reference.

Two Java™ class modules are computer generated. One Java™ class module that is computer generated is a Java™ class to handle the plist for the CICS® gate. Within the examples below, this Java™ class will be called "PlistHolder." The PlistHolder class handles plist changes and allows retrieval of either single plist parameters or an entire plist. As such, the PlistHolder class handles and manipulates data of the gate. This module will be termed the "PlistHolder class" herein for reference.

One additional Java™ class module that is computer generated is a Java™ conversion class that implements the interface that is a prototype of the gate implementation. As such, the conversion class generates a prototype of methods that are to be completed by a developer to cause the desired functionality for the respective gate with the method prototyped by the conversion class invoked. The conversion class instantiates an instance of the PlistHolder class to manipulate data of the gate. The conversion class completes the bridging and allows a PL/X application to directly call the Java™ implementation. This module will be termed the "conversion class" herein for reference.

An additional module that is generated (either computer generated or by a developer as described in more detail below) is a PL/X conversion gate module that operates as a Java™ interface within the PL/X system. This PL/X conversion gate module defines the Java™ methods/objects in PL/X that correspond to the CDURUNs (method interfaces) of the gate. The PL/X conversion gate module represents an interface prototype with a definition of method and data/attributes for the new functionality to be implemented within the legacy system. This module will be termed the "conversion gate module" herein for reference.

In response to completion of the automated generation of the respective modules, a developer may implement the Java™ code to create the desired behavior for the new module. Within the present example, the new module is a gate (Java™ method code), and as such, the developer may implement Java™ code to retrieve any input(s) and set any output(s) for the gate.

Utilizing the subject matter described herein, a PL/X developer familiar with the legacy application and that desires to implement a component in Java™ within the legacy application may create the interface for a PL/X gate (create a conversion gate interface for PL/X) and cause the automated generation of a Java™ class prototype and all of the supporting data definitions/classes. The Java™ class prototype may then be completed to implement the desired functionality, or may be passed to and filled in by a Java™ developer.

It should be understood that the present subject matter may be applied to other architectures and other languages. For example, other possible languages and platforms include programming language one (PL/I), procedural language/structured query language (PL/S), and other machine-oriented languages. As such, the present examples utilize PL/X and Java™ for ease of description purposes. However, it is understood that the present subject matter may be applied to other programming domains and legacy machine-oriented encoding platforms and to other object-oriented programming languages without departure from the scope of the present subject matter.

It should be noted that conception of the present subject matter resulted from recognition of certain limitations associated with development of new features for legacy platforms. Legacy platforms include platforms constructed using machine-oriented languages and constructs. It was desired to construct new features for these legacy platforms in newer object-oriented languages (e.g., Java™). It was also recognized that an automated approach to create infrastructure and bridging code for new object oriented language components within legacy machine-oriented language domains did not exist. The present subject matter improves continued development of new features within legacy platforms by providing for automated generation of bridging code to augment a legacy application using an object-oriented language, as described above and in more detail below. As such, improved maintenance and enhancement of legacy applications and platforms may be obtained through the automated generation of bridging code to augment a legacy application using an object-oriented language described herein.

The automated generation of bridging code to augment a legacy application using an object-oriented language described herein may be performed in real time to allow prompt computer generation of bridging code between a legacy platform and new functionality implemented within a newer object-oriented language. For purposes of the present description, real time shall include any time frame of sufficiently short duration as to provide reasonable response time for information processing acceptable to a user of the subject matter described. Additionally, the term "real time" shall include what is commonly termed "near real time"- generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
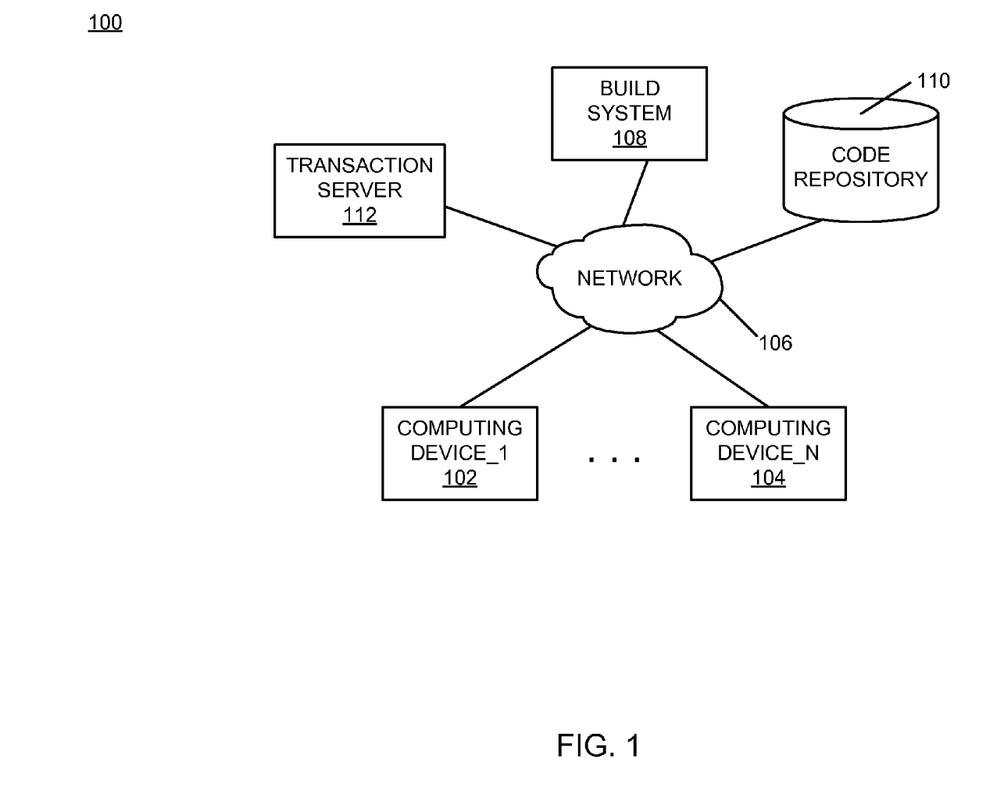
FIG. 1 is a block diagram of an example of an implementation of a system for automated generation of bridging code to augment a legacy application using an object-oriented language according to an embodiment of the present subject matter.

FIG. 1 is a block diagram of an example of an implementation of a system 100 for automated generation of bridging code to augment a legacy application using an object-oriented language. A computing device_1 102 through a computing device_N 104 communicate via a network 106 with a build system 108 and a code repository 110. The computing device_1 102 through the computing device_N 104 may be utilized, for example, by one or more developers to develop code and place code into the code repository 110 for compilation using the build system 108. The build system 108 may compile code archived within the code repository 110 and deploy that code for execution by a transaction server 112. The transaction server 112 represents a CICS® transaction server implemented in PL/X. It is understood that multiple transaction servers may be implemented and that one is shown for purposes of example.

As will be described in more detail below in association with FIG. 2 through FIG. 4, the computing device_1 102 through the computing device_N 104 and/or the build system 108 provide automated generation of bridging code to augment a legacy application using an object-oriented language. An interface definition created using PL/X is provided by a legacy application developer. In response to receipt of the interface definition created in PL/X, bridging code is computer generated to implement a Java™ prototype for implementation of the functionality to support the PL/X interface definition.

It should be noted that one or more of the computing device_1 102 through the computing device_N 104 and the build system 108 may be configured to automatically generate bridging code, as appropriate for a given implementation. For purposes of the present example, it should be noted that the computing device_1 102 through the computing device_N 104 may be utilized by one or more software developers to create conversion gate interfaces in PL/X for new features to be implemented in Java™. Bridging code from the created conversion gate interfaces defined in PL/X to a Java™ prototype may be automatically generated by either the respective computing device or the build system 108, as appropriate for a given implementation. These conversion implementations may be mixed within the system 100 as appropriate for a given implementation.

It should be noted that the computing device_1 102 through the computing device_N 104 may be a portable computing device, either by a user's ability to move the respective computing device to different locations, or by the device's association with a portable platform, such as a plane, train, automobile, or other moving vehicle. It should also be noted that the respective computing devices may be any computing device capable of processing information as described above and in more detail below. For example, the computing device_1 102 through the computing device_N 104 may include devices such as a personal computer (e.g., desktop, laptop, etc.) or any other device capable of processing information as described in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The build system 108 may include any device capable of processing code and data generated by a device, such as one or more of the computing device_1 102 through the computing device_N 104. As such, the build system 108 may include an application server or other device as appropriate for a given implementation. The build system 108 provides a centralized build process and builds code from different developers. However, it should be noted that the build process may be distributed among the respective computing devices shown within FIG. 1 without departure from the scope of the present subject matter.

Figure 2:
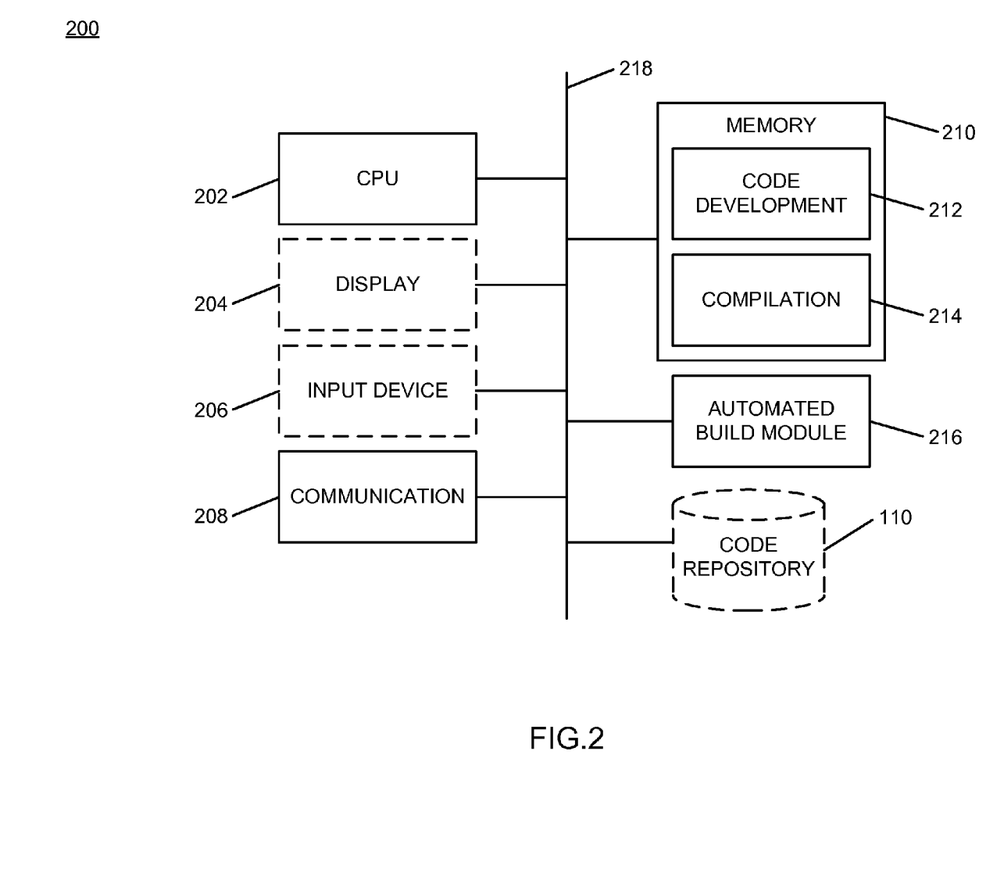
FIG. 2 is a block diagram of an example of an implementation of a core processing module capable of performing automated generation of bridging code to augment a legacy application using an object-oriented language according to an embodiment of the present subject matter.

FIG. 2 is a block diagram of an example of an implementation of a core processing module 200 capable of performing automated generation of bridging code to augment a legacy application using an object-oriented language. The core processing module 200 may be associated with each of the computing device_1 102 through the computing device_N 104 or the build system 108, as appropriate for a given implementation. Further, the core processing module 200 may provide different and complementary processing for automated generation of bridging code in association with each implementation, as described in more detail below.

As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. For example, the build system 108 may be network accessible for invoking build operations without requiring user interaction via a display and input device. Accordingly, the core processing module 200 may operate as a completely automated embedded device without direct user configurability or feedback. However, the core processing module 200 may also provide user feedback and configurability via the display 204 and the input device 206, respectively. For example, each of the computing device_1 102 through the computing device_N 104 may provide the display 204 and the input device 206 for use by developers during code development.

A communication module 208 provides interconnection capabilities that allow the core processing module 200 to communicate with other modules within the system 100. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a code development storage area 212 that stores code either during development or during a build process performed by the core processing module 200. Further, the code development storage area 212 may store bridging code that is generated within the core processing module 200, as described above and in more detail below. A compilation area 214 provides a memory area for code build processing.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An automated build module 216 is also illustrated. The automated build module 216 provides bridge code generation. The automated build module 216 may generate bridge code from either a conversion gate interface defined in PL/X to a Java™ prototype or from a defined Java™ method to a conversion gate interface in PL/X. The automated build module 216 may also provide compilation functionality, such as for example, where the core processing module 200 forms a portion of the build system 108 or where a distributed build process is implemented. The automated build module 216 implements the automated generation of bridging code to augment a legacy application using an object-oriented language of the core processing module 200.

Though the automated build module 216 is illustrated as a component-level module for ease of illustration and description purposes, it should be noted that the automated build module 216 may include any hardware, programmed processor(s), and memory used to carry out the functions of this module as described above and in more detail below. For example, the automated build module 216 may include additional controller circuitry in the form of application specific integrated circuits (ASICs), processors, and/or discrete integrated circuits and components for performing communication and electrical control activities associated with the respective devices. Additionally, the automated build module 216 may include interrupt-level, stack-level, and application-level modules as appropriate. Furthermore, the automated build module 216 may include any memory components used for storage, execution, and data processing for performing processing activities associated with the module.

It should also be noted that the automated build module 216 may form a portion of other circuitry described without departure from the scope of the present subject matter. Further, the automated build module 216 may alternatively be implemented as an application stored within the memory 210. In such an implementation, the automated build module 216 may include instructions executed by the CPU 202 for performing the functionality described herein. The CPU 202 may execute these instructions to provide the processing capabilities described above and in more detail below for the core processing module 200. The automated build module 216 may form a portion of an interrupt service routine (ISR), a portion of an operating system, a portion of a browser application, or a portion of a separate application without departure from the scope of the present subject matter.

The code repository 110 is also shown associated with the core processing module 200 within FIG. 2 to show that the code repository 110 may be coupled to the core processing module 200 without requiring external connectivity, such as via the network 106.

The CPU 202, the display 204, the input device 206, the communication module 208, the memory 210, the automated build module 216, and the code repository 110 are interconnected via an interconnection 218. The interconnection 218 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a kiosk or other location, while the CPU 202 and memory 210 may be located at a local or remote server. Many other possible arrangements for components of the core processing module 200 are possible and all are considered within the scope of the present subject matter. It should also be understood that, though the code repository 110 is shown as a separate component, the data stored within the code repository 110 may also be stored within the memory 210 without departure from the scope of the present subject matter. Accordingly, the core processing module 200 may take many forms and may be associated with many platforms.

The following pseudo code examples illustrate one possible implementation example of bridging code that may be generated by the automated processing described herein. It is understood that the examples provided are not limiting and that these examples are provided to further describe one possible bridging code implementation in pseudo code. It is further understood that the pseudo code examples are self-documenting by the nature of the syntax that is printed and that they additionally include comments that together allow a person of ordinary skill to understand the pseudo code examples without extensive line-by-line text description outside of the pseudo code examples themselves. However, some additional description has been provided for flow and readability. Many other possibilities exist for bridging code implementation and all are considered within the scope of the present subject matter.

The example pseudo code below shows example logical steps and the produced code artifacts to develop a Java™ component within a legacy application. It should be understood that the particular sequence of pseudo code presented within the example below is not limiting and that any sequence of automated code generation for bridging code modules may be utilized.

This particular example refers to a Java™ component that performs a codepage conversion, from extended binary coded decimal interchange code (EBCDIC) to universal transformation format-8 (UTF-8), which is a character encoding. The example below refers to CICS® gates. However, it may be extended to other object-oriented programming languages as appropriate for a given implementation.

Within the present example, it is assumed that the software developer defines an interface into the language of the legacy application, which for purposes of the present example, is a new CICS® gate containing the lines of code represented by the first example pseudo code example below.

```
! cpcvgate.plx
FUNCTION(EBCDIC_TO_UTF8_PLX)
    IN
        INPUT_CHARS
    OUT
        OUTPUT_CHARS
        RESPONSE(OK|EXCEPTION|DISASTER|
            INVALID|KERNERROR|PURGED)
        REASON(CONVERSION_FAILED)
INPUT_CHARS         is BLOCK for INPUT_STRING
OUTPUT_CHARS        is BUFFER for OUTPUT_STRING
%REFERENCED_PARAMETER
INPUT_STRING        is STRING(*)
OUTPUT_STRING       is STRING(*)
```

The gate has certain data defined. The strings "INPUT_CHARS" and "OUTPUT_CHARS," and a method called "EBCDIC_TO_UTF8_PLX" are defined. The method EBCDIC_TO_UTF8_PLX accepts the string INPUT_CHARS as an input and returns the string OUTPUT_CHARS as an output.

Upon completion of the interface definition within the example pseudo code above, the developer uploads the new gate into a software repository, such as the code repository 110. The software developer initiates the process of automatically generating the artifacts that compose the code bridge of the present subject matter. It should be noted that this processing may be integrated into the build process for the CICS® environment.

Automated processing results in the automated generation of four (4) software modules. As noted above, the order of generation of the respective software modules is not limited by the following example and any order appropriate for a given implementation may be used. A first software module is a "C" header file represented by the second example pseudo code below.

```
// Position of input_string into the array of byte arrays
#define INPUT_STRING_INDEX 0
// Position of output_string into the array of byte arrays
#define OUTPUT_STRING_INDEX 1
// Number of pointers contained into the cpcv_plist
#define NUMBER_OF_POINTERS 2
typedef struct
{
    int         input_string_len;
    char        *input_string;
    int         output_string_len;
    char        *output_string;
} cpcv_plist;
```

The C header file has been named "cpcvdata.h" and defines a memory structure called "cpcv_plist". The cpcv_plist memory structure includes a parameters list. This parameters list is passed to a method "invoke_ebcdic_to_utf8" defined below within the following third example pseudo code.

The following third example pseudo code represents a C module "cpcvjni.c." that defines the invoke_ebcdic_to_utf8 and that is passed to the parameters list defined by the cpcv_plist when called by the PL/X legacy code. The C module cpcvjni.c also defines a position of the pointers into an array of byte arrays passed to the Java™ method (see below).

An example of the cpcvjni.c file is represented by the following third example pseudo code.

```
// cpcvjni.c - implements the logic to call the Java method which performs the conversion
#include "cpcvdata.h"
int invoke_ebcdic_to_utf8(cpcv_plist *);
int invoke_ebcdic_to_utf8(cpcv_plist *plist)
{
/****************************************************************/
/* Convert the input data to JNI objects to be passed to the Java method */
/****************************************************************/
// Create a byte array for the plist
jbyteArray plist_ba = (*env)->NewByteArray(env, sizeof(cpcv_plist));
// Copy the plist into the byte array
(*env)->SetByteArrayRegion(env, plist_ba, 0, sizeof(cpcv_plist),
 (jbyte *)plist);
// Create an array of byte arrays to store the memory pointed by the pointers into the plist
jobjectArray ext_plist = (*env)->NewObjectArray(env,
    NUMBER_OF_POINTERS, byteArrayClass, NULL);
// Create a byte array for the input string
array_element = (*env)->NewByteArray(env, plist->input_string);
// Copy the input string into the byte array
(*env)->SetByteArrayRegion(env, array_element, 0,
    plist->input_string_len, (jbyte *)plist->input_string);
// Insert the byte array element into the array of byte arrays
(*env)->SetObjectArrayElement(env, ext_plist, INPUT_STRING_INDEX,
    array_element);
// Create a byte array for the output string to be returned
array_element = (*env)->NewByteArray(env, plist->output_string);
// Insert the byte array element into the array of byte arrays
(*env)->SetObjectArrayElement(env, ext_plist,
    OUTPUT_STRING_INDEX, array_element);
/****************************************************************/
/*     Invoke the Java method passing the byte arrays       */
/****************************************************************/
(*env)->CallStaticVoidMethod(env, conversionClass, ebcdic_to_utf8,
    plist_ba, ext_plist);
/****************************************************************/
/*    Copy the output string returned into the ext_plist into the plist */
/****************************************************************/
// get the output string element and its length
outputStringElement= (jbyteArray) (*env)->GetObjectArrayElement(env,
ext_plist, 1);
jint len = (*env)->GetArrayLength(env, outputStringElement);
// allocate memory to hold the output string value
result = malloc(len + 1);
// get the value of the output string
(*env)->GetByteArrayRegion(env, outputStringElement, 0, len,
 (jbyte *)result);
// copy service_name ptr/len into the plist
memcpy(plist->output_string, result, plist->output_string_len);
// free memory
free(result);
}
```

The C module cpcvjni.c defines the logic to transform data as defined within the cpcvdata.h pseudo code above into Java™ native interface (JNI) objects and to invoke the Java™ method "ebcdicToUTF8" passing the transformed data, as defined and described below. It should be noted that the ebcdicToUTF8 method is defined by the fifth example pseudo code (that follows the fourth example pseudo code below). The memory as defined by the cpcv_plist structure in the cpcvdata.h file is stored into a byte array. The content of the memory pointed to/referenced by the pointers in the cpcv_plist structure is stored in an array of byte arrays.

The following fourth example pseudo code represents a Java™ module that includes the following lines of pseudo code.

```
public class CpcvDataHandler {
    protected byte[ ] plist;              // The main parameter list
    protected byte[ ][ ] ext_plist;       // Byte arrays for pointers
    /* Offset of the different parameters stored into the plist
    private static final int
        INPUT_STRING_LENGTH_OFFEST = 0,
        INPUT_STRING_OFFEST = 32,
        OUTPUT_STRING_LENGTH_OFFEST = 0,
        OUTPUT_STRING_OFFEST = 32;
    /* Index of the pointers into the
    private static final int
        INPUT_STRING_INDEX = 0,
        OUTPUT_STRING_INDEX = 1;
    // Constructor: sets plist and ext_plist
    public CpcvDataHandler(byte[ ] value, byte[ ][ ] value2)
    {
        // Set the parameter list
        plist = value;
        // Set the pointers list
        ext_plist = value2;
    }
    // method to return the input string
    public byte[ ] getInputString( )
    {
        // retrieve the input string length (in the plist, from the offset)
        int inputStringLength =
            ((plist[INPUT_STRING_LENGTH_OFFEST
            ]&0xFF)<<24)
            + ((plist[INPUT_STRING_LENGTH_OFFEST
            +1]&0xFF)<<16)
            + ((plist[INPUT_STRING_LENGTH_OFFEST
            +2]&0xFF)<< 8)
            + ((plist[INPUT_STRING_LENGTH_OFFEST
            +3]&0xFF));
        byte[ ] value = new byte[ inputStringLength];
        //Copy the input string into the return value
        System.arraycopy(ext_ptlist[INPUT_STRING_INDEX], 0,
        value, 0, n);
        return value;
    }
    // method to set the output string
    public void setOutputString(byte[ ] value, int length)
    {
        int n = length;
        // Store the output string length into the plist
        plist[OUTPUT_STRING_LENGTH_OFFEST
        ]=(byte)(n>>>24);
        plist[OUTPUT_STRING_LENGTH_OFFEST
        +1]=(byte)(n>>>16);
        plist[OUTPUT_STRING_LENGTH_OFFEST
        +2]=(byte)(n>>> 8);
        plist[OUTPUT_STRING_LENGTH_OFFEST +3]=(byte)(n );
        // Store the output string value into the array of byte arrays
        System.arraycopy(value, 0,
        ext_plist[OUTPUT_STRING_INDEX], 0, n);
    }
}
```

The class "CpcvDataHandler" handles/manages the byte array and the array of byte arrays passed from the JNI layer (represented within the cpcvjni.c presented above). In particular, the CpcvDataHandler class implements the "get" and "set" methods to retrieve and set parameters into the respective arrays.

The following fifth example pseudo code represents a Java™ class skeleton that includes the following lines of pseudo code.

```
public class ConversionClass {
    public void ebcdicToUTF8(byte[ ] plist, byte[ ][ ] ext_plist) {
        CpcvDataHandler plistHolder = new CpcvDataHandler(plist,
            ext_plist);
    }
}
```

The "ConversionClass" class defines the skeleton of the method "ebcdicToUTF8," which is the Java™ implementation of the method "EBCDIC_TO_UTF8_PLX" defined in the gate (of the first example pseudo code above). In the method skeleton, an instance of the "CpcvDataHandler" class is allocated/instantiated. The CpcvDataHandler class provides a computer generated skeleton/template for placement of the actual code of the "ebcdicToUTF8" method.

As represented by the following sixth example pseudo code, the developer may download the ConversionClass Java™ module from the code repository and write the code to fill in the automatically-generated template for the ebcdicToUTF8 method.

```
public void ebcdicToUTF8(byte[ ] plist, byte[ ][ ] ext_plist) {
    CpcvDataHandler plistHolder = new CpcvDataHandler(plist,
        ext_plist);
    // Create a string from the input byte array (coded in EBCDIC)
    String OutputString = new String(plistHolder .getInputString( ),
        "Cp1047");
    // allocate a byte array and store into it the string converted in UTF-8
    byte[ ] OutputByte Array = OutputString .getBytes("UTF-8");
    // set the output string into the ext_plist
    plistHolder.setOutputString(OutputByteArray,
        OutputByteArray.length );
}
```

In response to completion, the developer uploads the completed template into the code repository and builds the ConversionClass Java™ module. The legacy application is now ready to call the Java™ method ebcdicToUTF8.

As such, the example processing described above takes as input a PL/X definition of a gate, and computer generates several modules. These computer-generated modules form the bridging code between the PL/X gate definition and the Java™ class. A template for the Java™ class is provided and the developer may fill in details of the gate functionality. Accordingly, the developer may implement new functionality within the legacy application that is coded in a machine-oriented language using an object-oriented language without delays of implementation associated within manual generation of the bridging code. The developer provides the PL/X gate definition, initiates automated generation of the bridging code, and then fills in the details of the new functionality for the gate using the computer generated skeleton/template for the object-oriented class. Many other possibilities exist for computer-based automated generation of bridging code to augment a legacy application using an object-oriented language and all are considered within the scope of the present subject matter. It should be noted that invocation of the method from the legacy application is not described herein as this is understood by developers of legacy PL/X applications.

Figure 3:
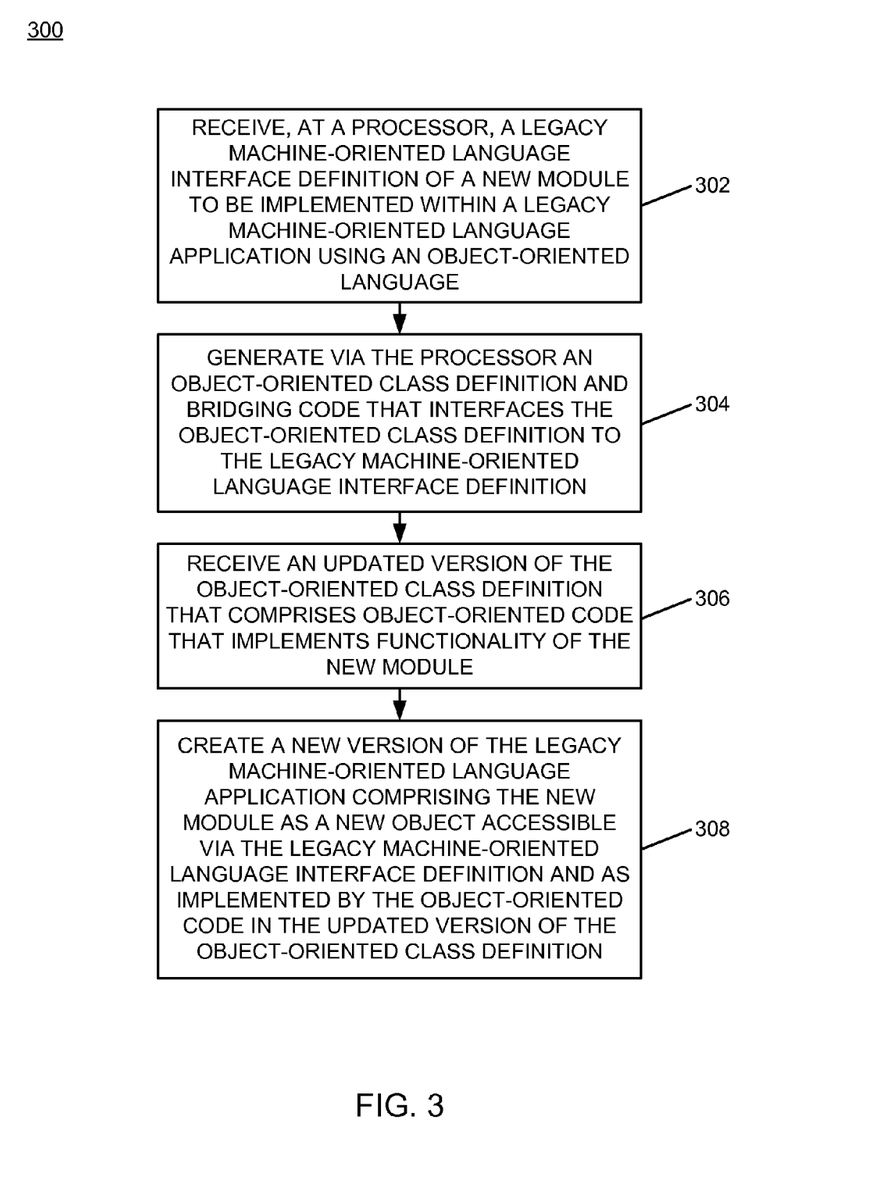
FIG. 3 is a flow chart of an example of an implementation of a process for automated generation of bridging code to augment a legacy application using an object-oriented language according to an embodiment of the present subject matter.
Figure 4:
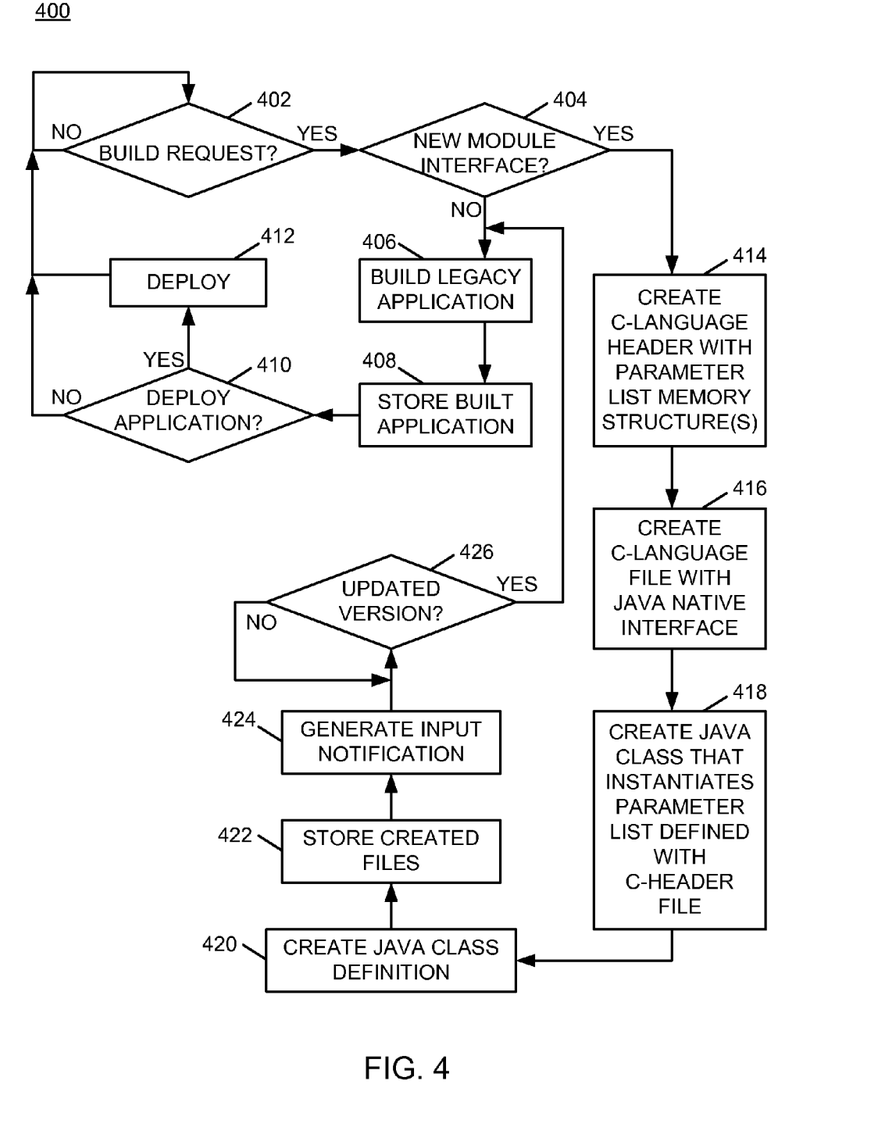
FIG. 4 is a flow chart of an example of an implementation of a process for automated generation of bridging code to augment a legacy application using an object-oriented language according to an embodiment of the present subject matter.

FIG. 3 through FIG. 4 described below represent example processes that may be executed by devices, such as the core processing module 200, to perform the automated generation of bridging code to augment a legacy application using an object-oriented language associated with the present subject matter. Many other variations on the example processes are possible and all are considered within the scope of the present subject matter. The example processes may be performed by modules, such as the automated build module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added without departure from the scope of the present subject matter.

FIG. 3 is a flow chart of an example of an implementation of a process 300 for automated generation of bridging code to augment a legacy application using an object-oriented language. At block 302, the process 300 receives, at a processor, a legacy machine-oriented language interface definition of a new module to be implemented within a legacy machine-oriented language application using an object-oriented language. At block 304, the process 300 generates via the processor an object-oriented class definition and bridging code that interfaces the object-oriented class definition to the legacy machine-oriented language interface definition. At block 306, the process 300 receives an updated version of the object-oriented class definition that comprises object-oriented code that implements functionality of the new module. At block 308, the process 300 creates a new version of the legacy machine-oriented language application comprising the new module as a new object accessible via the legacy machine-oriented language interface definition and as implemented by the object-oriented code in the updated version of the object-oriented class definition.

FIG. 4 is a flow chart of an example of an implementation of a process 400 for automated generation of bridging code to augment a legacy application using an object-oriented language. It should be noted that the machine-oriented programming language is considered a legacy machine-oriented language and that the legacy application may include a programming language/cross system (PL/X) customer information control system (CICS®) transaction server application or other application as appropriate for a given implementation. Further, as with certain other examples described above, Java™ is used as an example object-oriented programming language in which new functionality for a legacy application is to be implemented. As also noted above, other modern languages may be used to implement new functionality within a legacy application and any such modern language may be used as appropriate for a given implementation.

At decision point 402, the process 400 makes a determination as to whether a request to build a legacy application has been received. A request to build a legacy application may include receiving a legacy machine-oriented language interface definition of the new module as input during invocation of a build process for the new version of the legacy application. It should be noted that the new module may include a new gate of a domain within a programming language/cross system (PL/X) customer information control system (CICS®) transaction server application, or a new module of another application as appropriate for a given implementation.

In response to determining that a request to build a legacy application has been received, the process 400 makes a determination at decision point 404 as to whether a machine-oriented language interface definition of a new module has been received as input during invocation of the build process. It should be noted that the process 400 may receive and process multiple received legacy machine-oriented language interface definitions and that the description of the process 400 uses the singular tense for ease of description and not limitation. As such, the processing described below in association with generating an object-oriented class definition and bridging code that interfaces the object-oriented class definition to a received legacy machine-oriented language interface definition, may include generating multiple object-oriented class definitions and bridging code for each definition that interfaces the respective object-oriented class definition to the respective received legacy machine-oriented language interface definition.

In response to determining that a machine-oriented language interface definition of a new module has not been received as input during invocation of the build process, the process 400 builds the legacy application at block 406. At block 408, the process 400 stores the built application, such as within the code repository 110. At decision point 410, the process 400 makes a determination as to whether to deploy the legacy application. In response to determining to deploy the legacy application, the process 400 deploys the legacy application at block 412 to at least one server device, such as the transaction server 112. In response to completion of deploying the legacy application at block 412 or in response to determining not to deploy the legacy application at decision point 410, the process 400 returns to decision point 402 to await another build request for a legacy application.

Returning to the description of decision point 404, in response to determining that a machine-oriented language interface definition of a new module has been received as input during invocation of the build process, the process 400 performs several automated code generation activities that include generating an object-oriented class definition and bridging code that interfaces the object-oriented class definition to the legacy machine-oriented language interface definition that was received. It should be noted that the order represented is not to be considered limiting and that any order may be used as appropriate for a given implementation.

At block 414, the process 400 creates a C-language header file ("C header module) that defines a parameter list as at least one memory structure of the new module based upon parameter definitions within the legacy machine-oriented language interface definition that was received. At block 416, the process 400 creates a C-language file ("JNI module") that implements an object native interface (e.g., a JNI interface) for the object-oriented (Java™) class definition to be defined. At block 418, the process 400 creates an object-oriented (Java™) class ("PlistHolder class") that instantiates the parameter list defined within the C-language header file. At block 420, the process 400 creates the object-oriented class definition ("conversion class") as an object-oriented class prototype usable to instantiate the new module as the new object within the new version of the legacy application.

At block 422, the process 400 stores the created files in a location accessible to code developers, such as the code repository 110 or a memory location associated with one of the computing device_1 102 through the computing device_N 104 (e.g., the code development storage area 212 of the memory 210). At block 424, the process 400 generates an input notification/request to a code developer. The input notification may include a screen prompt at a device that initiated the build process, a message (e.g., email or text message), or other notification as appropriate for a given implementation.

At decision point 426, the process 400 makes a determination as to whether an updated version of the object-oriented class definition that includes object-oriented code (e.g., Java™ code) that implements functionality of the new module has been received. In response to determining that an updated version of the object-oriented class definition that includes object-oriented code (e.g., Java™ code) that implements functionality of the new module has been received, the process 400 returns to block 406 to build the legacy application and iterates as described above. However, for a build invocation that includes object-oriented (e.g., Java™) code, the build process will include appropriate compilation and other building and linking operations that support the integration of the object-oriented code into the legacy application. For example, the process 400 may compile the Java™ programming language code using a Java™ programming language compiler (e.g., Javac). If using the Javac compiler, the process 400 may issue a compilation command, such as "javac*.Java" within the directory containing the Java™ programming language code. Regarding the additional native code modules (e.g., the C programming language code modules), the process 400 may compile these additional native code modules using a C-language compiler that compiles for the target platform and may bind the native code into a format, such as a dynamic link library (DLL), using a binding program compatible with/appropriate for the target platform. It is understood that many different machine environments/platforms may be used to implement the present subject matter. As such, many variations on compilation and building of the respective modules for these different environments/platforms are possible, and all such variations are considered within the scope of the present subject matter.

It should be noted that deploying the legacy application at block 412 may include implementing the new version of the legacy application including the new module within a legacy application platform with the functionality of the new module within the legacy application platform implemented by the object-oriented code in the updated version of the object-oriented class definition.

As such, the process 400 receives one or more legacy machine-oriented language interface definitions and computer generates an object-oriented class definition and bridging code that interfaces the object-oriented class definition to the respective received legacy machine-oriented language interface definition for one or more new modules/features. The process 400 prompts a developer for a new version of a generated object-oriented class definition that includes object-oriented code that implements functionality of the new module functional object-oriented code. The process 400 builds the legacy application for execution within a machine-oriented language environment or platform with one or more new modules defined in an object-oriented language.

As described above in association with FIG. 1 through FIG. 4, the example systems and processes provide automated generation of bridging code to augment a legacy application using an object-oriented language. Many other variations and additional activities associated with automated generation of bridging code to augment a legacy application using an object-oriented language are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening 110 controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    receiving, at a processor, a legacy machine-oriented language interface definition of a new module to be implemented, using an object-oriented language, to provide a new feature within a legacy machine-oriented language application that is executable within a legacy application execution platform;
    generating, via the processor, an object-oriented class definition and bridging code that interfaces the object-oriented class definition to the legacy machine-oriented language interface definition, further comprising creating the object-oriented class definition as an object-oriented class prototype usable to instantiate the new module as the new object within the new executable version of the legacy machine-oriented language application;
    receiving an updated version of the object-oriented class definition that comprises object-oriented code that implements functionality of the new feature within the new module; and
    building a new executable version of the legacy machine-oriented language application, executable within the legacy application execution platform, and comprising the new module within the new executable version as a new object accessible via the legacy machine-oriented language interface definition and with the functionality of the new feature as implemented by the object-oriented code in the updated version of the object-oriented class definition.

2. The method of claim 1, further comprising implementing the new executable version of the legacy machine-oriented language application comprising the new module within the legacy machine-oriented language application platform.

3. The method of claim 1, where receiving, at the processor, the legacy machine-oriented language interface definition of the new module to be implemented, using the object-oriented language, to provide the new feature within the legacy machine-oriented language application that is executable within the legacy application execution platform comprises receiving the legacy machine-oriented language interface definition of the new module as input during invocation of a build process for the new executable version of the legacy machine-oriented language application.

4. The method of claim 1, where the legacy machine-oriented language application comprises a programming language/cross system (PL/X) customer information control system transaction server application.

5. The method of claim 1, where the new module comprises a new gate of a domain within a programming language/cross system (PL/X) customer information control system transaction server application.

6. A system, comprising:
    a memory; and
    a processor programmed to:
        receive a legacy machine-oriented language interface definition of a new module to be implemented, using an object-oriented language, to provide a new feature within a legacy machine-oriented language application that is executable within a legacy application execution platform;
        generate an object-oriented class definition and bridging code that interfaces the object-oriented class definition to the legacy machine-oriented language interface definition, comprising the processor being further programmed to create, within the memory, the object-oriented class definition as an object-oriented class prototype usable to instantiate the new module as the new object within the new executable version of the legacy machine-oriented language application;
        receive an updated version of the object-oriented class definition that comprises object-oriented code that implements functionality of the new feature within the new module; and
        build, within the memory, a new executable version of the legacy machine-oriented language application, executable within the legacy application execution platform, and comprising the new module within the new executable version as a new object accessible via the legacy machine-oriented language interface definition and with the functionality of the new feature as implemented by the object-oriented code in the updated version of the object-oriented class definition.

7. The system of claim 6, where the processor is further programmed to implement the new executable version of the legacy machine-oriented language application comprising the new module within the legacy machine-oriented language application platform.

8. The system of claim 6, where, in being programmed to receive the legacy machine-oriented language interface definition of the new module to be implemented, using the object-oriented language, to provide the new feature within the legacy machine-oriented language application that is executable within the legacy application execution platform, the processor is programmed to receive the legacy machine-oriented language interface definition of the new module as input during invocation of a build process for the new executable version of the legacy machine-oriented language application.

9. The system of claim 6, where the legacy machine-oriented language application comprises a programming language/cross system (PL/X) customer information control system transaction server application.

10. The system of claim 6, where the new module comprises a new gate of a domain within a programming language/cross system (PL/X) customer information control system transaction server application.

11. A computer program product comprising a computer readable storage medium including computer readable program code, where the computer readable program code when executed on a computer causes the computer to:
  receive a legacy machine-oriented language interface definition of a new module to be implemented, using an object-oriented language, to provide a new feature within a legacy machine-oriented language application that is executable within a legacy application execution platform;
  generate an object-oriented class definition and bridging code that interfaces the object-oriented class definition to the legacy machine-oriented language interface definition, comprising the computer readable program code when executed on the computer further causing the computer to create the object-oriented class definition as an object-oriented class prototype usable to instantiate the new module as the new object within the new executable version of the legacy machine-oriented language application;
  receive an updated version of the object-oriented class definition that comprises object-oriented code that implements functionality of the new feature within the new module; and
  build a new executable version of the legacy machine-oriented language application, executable within the legacy application execution platform, and comprising the new module within the new executable version as a new object accessible via the legacy machine-oriented language interface definition and with the functionality of the new feature as implemented by the object-oriented code in the updated version of the object-oriented class definition.

12. The computer program product of claim 11, where the computer readable program code when executed on the computer further causes the computer to implement the new executable version of the legacy machine-oriented language application comprising the new module within the legacy machine-oriented language application platform.

13. The computer program product of claim 11, where in causing the computer to receive the legacy machine-oriented language interface definition of the new module to be implemented, using the object-oriented language, to provide the new feature within the legacy machine-oriented language application that is executable within the legacy application execution platform, the computer readable program code when executed on the computer causes the computer to receive the legacy machine-oriented language interface definition of the new module as input during invocation of a build process for the new executable version of the legacy machine-oriented language application.

14. The computer program product of claim 11, where the legacy machine-oriented language application comprises a programming language/cross system (PL/X) customer information control system transaction server application.

15. The computer program product of claim 11, where the new module comprises a new gate of a domain within a programming language/cross system (PL/X) customer information control system transaction server application.

* * * * *